United States Patent
Schmid et al.

(10) Patent No.: US 10,374,697 B2
(45) Date of Patent: Aug. 6, 2019

(54) DISTRIBUTED DUPLEXER CONFIGURATION FOR BLOCKING AND LINEARITY

(71) Applicant: ANDREW WIRELESS SYSTEMS GMBH, Buchdorf (DE)

(72) Inventors: Peter Schmid, Marxheim-Neuhausen (DE); Alfons Dussmann, Gansheim (DE); Thomas Kummetz, Adelsried (DE)

(73) Assignee: Andrew Wireless Systems GmbH, Buchdorf (DE)

( * ) Notice: Subject to any disclaimer, the term of this patent is extended or adjusted under 35 U.S.C. 154(b) by 156 days.

(21) Appl. No.: 14/973,042

(22) Filed: Dec. 17, 2015

(65) Prior Publication Data

US 2016/0329957 A1 Nov. 10, 2016

Related U.S. Application Data

(60) Provisional application No. 62/157,187, filed on May 5, 2015.

(51) Int. Cl.

| | |
|---|---|
| *H04B 3/36* | (2006.01) |
| *H04B 7/26* | (2006.01) |
| *H04B 1/50* | (2006.01) |
| *H04B 7/155* | (2006.01) |
| *H04L 5/14* | (2006.01) |
| *H04W 84/04* | (2009.01) |
| *H04W 88/08* | (2009.01) |

(52) U.S. Cl.
CPC .............. *H04B 7/2606* (2013.01); *H04B 1/50* (2013.01); *H04B 7/155* (2013.01); *H04L 5/14* (2013.01); *H04W 84/047* (2013.01); *H04W 88/085* (2013.01)

(58) Field of Classification Search
CPC ....... H04L 5/14; H04B 7/2606; H04W 88/085
See application file for complete search history.

(56) References Cited

U.S. PATENT DOCUMENTS

| | | |
|---|---|---|
| 6,472,952 B1 | 10/2002 | Sakai et al. |
| 7,181,175 B2 | 2/2007 | Nimmo-Smith et al. |
| (Continued) | | |

FOREIGN PATENT DOCUMENTS

| | | |
|---|---|---|
| GB | 2444980 | 6/2008 |

OTHER PUBLICATIONS

Bahi et al., Performance evaluation of a class E power amplifier loaded by a high-isolation duplexer, 2012, 4 pages.

(Continued)

*Primary Examiner* — Bo Hui A Zhu
(74) *Attorney, Agent, or Firm* — Fogg & Powers LLC

(57) ABSTRACT

A telecommunications system may be configured to improve linearity and blocking. In some aspects, the telecommunications system may include a duplexer for coupling a common port to a receive path and a transmit path. A distributed low-noise amplifier having two or more separate active devices (e.g., amplifiers) may be positioned in the receive path. A filtering element (e.g., a band-pass filter) may be positioned between the two or more separate active devices. A signal may be routed by the duplexer through the distributed low-noise amplifier. The filtering element may attenuate transmit signals in the receive path.

18 Claims, 4 Drawing Sheets

(56) References Cited

U.S. PATENT DOCUMENTS

| | | | |
|---|---|---|---|
| 7,916,671 | B1 | 3/2011 | McAdam et al. |
| 8,059,963 | B2 | 11/2011 | Kim et al. |
| 8,063,718 | B2 | 11/2011 | Ueda et al. |
| 8,175,535 | B2 | 5/2012 | Mu et al. |
| 8,958,351 | B2 | 2/2015 | Heo et al. |
| 9,025,502 | B2 | 5/2015 | Park |
| 2002/0039885 | A1 | 4/2002 | Weissman et al. |
| 2011/0051784 | A1* | 3/2011 | Kawasaki .......... H04B 7/15542 375/211 |
| 2012/0309293 | A1* | 12/2012 | Kummetz ............ H04B 7/2606 455/11.1 |
| 2014/0349592 | A1 | 11/2014 | Okazaki et al. |
| 2015/0349892 | A1* | 12/2015 | Fischer ............ H04B 10/25759 398/66 |

OTHER PUBLICATIONS

International Searching Authority, "International Search Report and Written Opinion from PCT Application No. PCT/IB2015/059740 dated Feb. 24, 2016", "from PCT Counterpart of U.S. Appl. No. 14/973,042", Feb. 24, 2016, pp. 1-, Published in: WO.

* cited by examiner

DISTRIBUTED DUPLEXER CONFIGURATION FOR BLOCKING AND LINEARITY

CROSS-REFERENCE TO RELATED APPLICATION

This claims priority to U.S. Provisional Application Ser. No. 62/157,187, filed May 5, 2015 and titled "Distributed Blocking and Linearity Enhanced Duplexer," the contents of which are incorporated herein by reference.

TECHNICAL FIELD

The present disclosure relates generally to telecommunications, and, more particularly (although not necessarily exclusively), to duplexer configurations for improving blocking and linearity in distributed antenna systems or repeaters.

BACKGROUND

A telecommunications system may include a distributed antenna system ("DAS") or a repeater that may be used to extend the coverage of a cellular communication system. For example, a DAS may extend coverage to areas of traditionally low signal coverage within buildings, tunnels, or in areas obstructed by terrain features. A DAS may include one or more head-end units in communication with carrier systems, such as base transceiver stations of cellular service providers. The DAS may also include remote units physically separated from the head-end unit, but in communication with the head-end unit via a serial link that may be copper, optical, or other suitable communication medium.

The remote units may wirelessly communicate with user devices positioned in a coverage area. For example, the remote units may be positioned in a building, tunnel, or other structure that prevents or limits communications directly with the carriers. Remote units amplify downlink signals received from the base station via a head-end unit and radiate the downlink signal using an antenna. The remote unit recovers uplink signals from mobile user equipment and provides the uplink signals to the head-end unit. The uplink signals may be summed together and provided back to the base station.

A remote unit may include at least one duplexer. The duplexer may isolate a transmitter output from a receiver input by allowing frequencies within the downlink band to be provided from the transmitter output to the antenna and allowing frequencies within the uplink band to be provided from the antenna output, input, respectively, to the receiver.

SUMMARY

According to one aspect of the present disclosure, a remote unit may include a duplexer for coupling a common port to a receive path and a transmit path. The remote unit may also include a band-pass filter between a first amplifier and a second amplifier. The first amplifier and the second amplifier may together form a low-noise amplifier in the receive path.

According to another aspect of the present disclosure, a telecommunications system may include a duplexer for coupling a common port to a receive path and a transmit path. The telecommunications system may also include a distributed low-noise amplifier having two or more separate active devices. The telecommunications system may also include at least one filtering element positioned between the two or more separate active devices.

According to another aspect of the present disclosure, a method for improving linearity and blocking performance in a telecommunications system may include receiving a signal at a common port. The common port may be coupled to a receive path and a transmit path by a duplexer. The method may also include routing the signal through a first amplifier and a second amplifier in the receive path. The first amplifier and the second amplifier may together form a low-noise amplifier. The method may also include attenuating a transmit signal in the receive path using a band-pass filter positioned between the first amplifier and the second amplifier.

DETAILED DESCRIPTION

Figure 1:
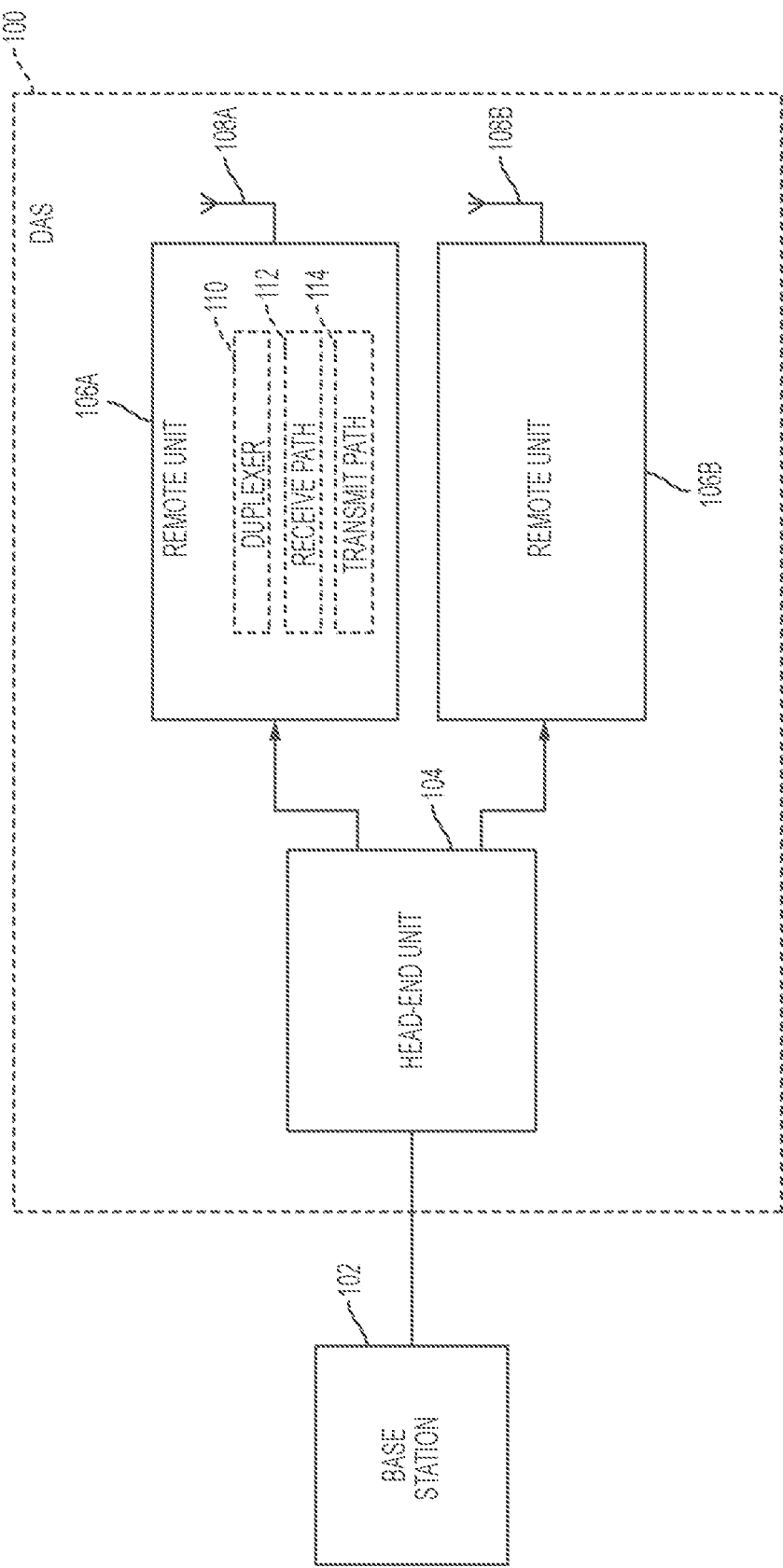
FIG. 1 is a block diagram of an example of an environment for a telecommunications system that may include a duplexer configuration according to one aspect.

Certain aspects and examples relate to a telecommunications system including a duplexer configuration that improves blocking and linearity performance by alternating active devices, such as amplifiers, and filtering elements, such as band-pass filters, in a signal path. The duplexer configuration may include a duplexer coupled to a receive path and a transmit path. The duplexer may couple the receive path and the transmit path to a single antenna at a common port of the duplexer. Using a duplexer may allow the receive path and the transmit path to operate at different frequencies (e.g. frequency division duplex). The duplexer configuration may include a filtering element (e.g., a band-pass filter) in the receive path to attenuate transmit signals traversing the receive path. The filtering element may be positioned between two active devices (e.g., amplifiers) that together form a low-noise amplifier. In some aspects, the duplexer configuration may be disposed in a remote unit of the telecommunications system, although the duplexer configuration may be used for any antenna or common port in the telecommunications system (e.g., disposing the duplexer configuration in a head-end unit) without departing from the scope of the present disclosure.

The use of duplexers in the telecommunications system may allow a single-antenna port to both receive signals in the receive path and transmit signals traversing the transmit path. But, combining the receive path and the transmit path to one antenna port may entail stringent isolation requirements to the radio frequency ("RF") performance of the duplexer. These requirements may allow for operating the telecommunications system with minimum degradation of the transmit path and the receive path. In some aspects, the output power of the transmit path may be degraded in an acceptable manner. In additional aspects, sensitivity and spurious free dynamic range of the receive path may have no or negligible deterioration. The strict isolation requirements may result in high cost, space constraints, and higher insertion loss of the duplexer. The strict requirements may also include higher testing and measurement efforts. According to some examples of the present disclosure, the duplexer configuration may be modified by distributing the performance of the duplexer configuration to relax certain performance and implementation expectations for the duplexer. Relaxing the performance and implementation expectations may improve space constraints, reduce costs for materials and testing, and enhance receive path performance (e.g., improved sensitivity of the receive path by lower insertion loss of the duplexer).

Protecting the receive path against the transmit path may be of interest when using a duplexer. Some of the aspects that may be considered to achieve sufficient protection of the receive path include preventing blocking in the receive path and increasing linearity in the receive path. Blocking may be due to activating an automatic level control or saturation of a low-noise amplifier caused by transmit signals traversing the transmit path. For example, a transmit path may be operated in the frequency range of 925 MHz to 960 MHz. The receive path may be operated in the frequency range of 880 MHz to 915 MHz. But, the receive path following a duplexer may be broadband (e.g., having the same or nearly the same performance for 880 MHz to 960 MHz). Thus, it may be necessary to prevent activating the automatic level control in the receive path from being activated or the low-noise amplifier from being saturated by unwanted transmit signals (925 MHz to 960 MHz) that may consequently block wanted receive signals (880 MHz to 915 MHz).

Achieving sufficient protection of the receive path may also involve increasing linearity by avoiding interferers in the receive path at receive path frequencies. The interferers may be generated by transmit signals in the receive path or by combined transmit and receive signals in the receive path. For example, with respect to interferers generated by transmit signals in the receive path, the transmit path may be operated in the frequency range of 1930 MHz to 1995 MHz. The receive path may be operated in the frequency range of 1850 MHz to 1915 MHz. But, the receive path following the duplexer may have the same or nearly the same performance for 1850 MHz to 1995 MHz, Thus, it may be necessary to avoid impairing wanted receive signals (e.g., a signal at 1890 MHz) by an interferer that may be operating at 1890 MHz and generated by unwanted transmit signals at 1930 MHz and 1970 MHz in the receive path. Similarly, with respect to interferers generated by transmit and receive signals in the receive path, it may be necessary to avoid impairing wanted receive signals (e.g. a signal at 1875 MHz) by an interferer that may be operating at 1875 MHz and generated by an unwanted transmit signal at 1955 MHz and a wanted receive signal at 1915 MHz in the receive path.

Detailed descriptions of certain examples are discussed below. These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure. The various figures described below depict examples of implementations for the present disclosure, but should not be used to limit the present disclosure.

FIG. 1 shows an example of a telecommunications system environment that may be used for implementing a duplexer configuration to improve blocking and linearity performance. The telecommunications system in FIG. 1 is a distributed antenna system ("DAS") 100, but other types of telecommunications systems may be used. The DAS 100 may be communicatively coupled to a base station 102 via a head-end unit 104 in the DAS 100. The DAS 100 also includes the head-end unit 104 and multiple remote units 106A, 106B, each remote unit 106A, 106B including an antenna 108A, 108B, respectively. Although FIG. 1 shows one head-end unit 104 and two remote units 106A, 106B, the DAS 100 may include any number of head-end units and remote units without departing from the scope of the present disclosure. The head-end unit 104 may be a master unit or other suitable unit that may communicate with one or more base stations or other transceiver devices in the DAS 100. In some aspects, the head-end unit 104 may include an optical transceiver that transmits optical signals to the remote units 106A, 106B. The head-end unit 104 may communicate with remote units 106A, 106B in different coverage zones of the same DAS 100.

In some aspects, the DAS 100 may communicate signals between the base station 102 and terminal devices in one or more coverage zones of the DAS 100 via the head-end unit 104 and the remote units 106A, 106B that service the coverage zones. Non-limiting examples of terminal devices may include mobile stations, mobile devices, access terminals, subscriber stations, remote stations, user terminals, subscriber units, cellular phones, smartphones, etc. The head-end unit 104 may be communicatively coupled with the base station 102 and the remote units 106A, 106B in any suitable manner. A suitable communication link may be a wired connection or a wireless connection. Examples of wired connections may include, but are not limited to, a connection via a copper cable, an optical fiber, or another suitable communication medium. Examples of wireless connections may include, but are not limited to, a wireless RF communication link or a microwave link. The type of communication link between the base station 102 and the head-end unit 104 may be the same as or different from the type of communication link between the head-end unit 104 and the remote units 106A, 106B. Although FIG. 1 depicts direct links between the head-end unit 104 and the remote units 106A, 106B, other implementations are possible. For example, in some aspects, the head-end unit 104 may be communicatively coupled to the remote units 106A, 106B via one or more extension units or other intermediate devices. In some aspects, a remote unit 106A may include a duplexer configuration including a duplexer 110 coupling the antenna 108A of the remote unit 106A at a common port of the duplexer 110 to a receive path 112 and a transmit path 114 of the remote unit 106A, 106B. Although the duplexer configuration is shown as disposed in the remote unit 106A in FIG. 1, a duplexer configuration may be disposed in any unit of the DAS 100 (e.g., the head-end unit 104, remote unit 106B, extension units, etc.).

Figure 2:
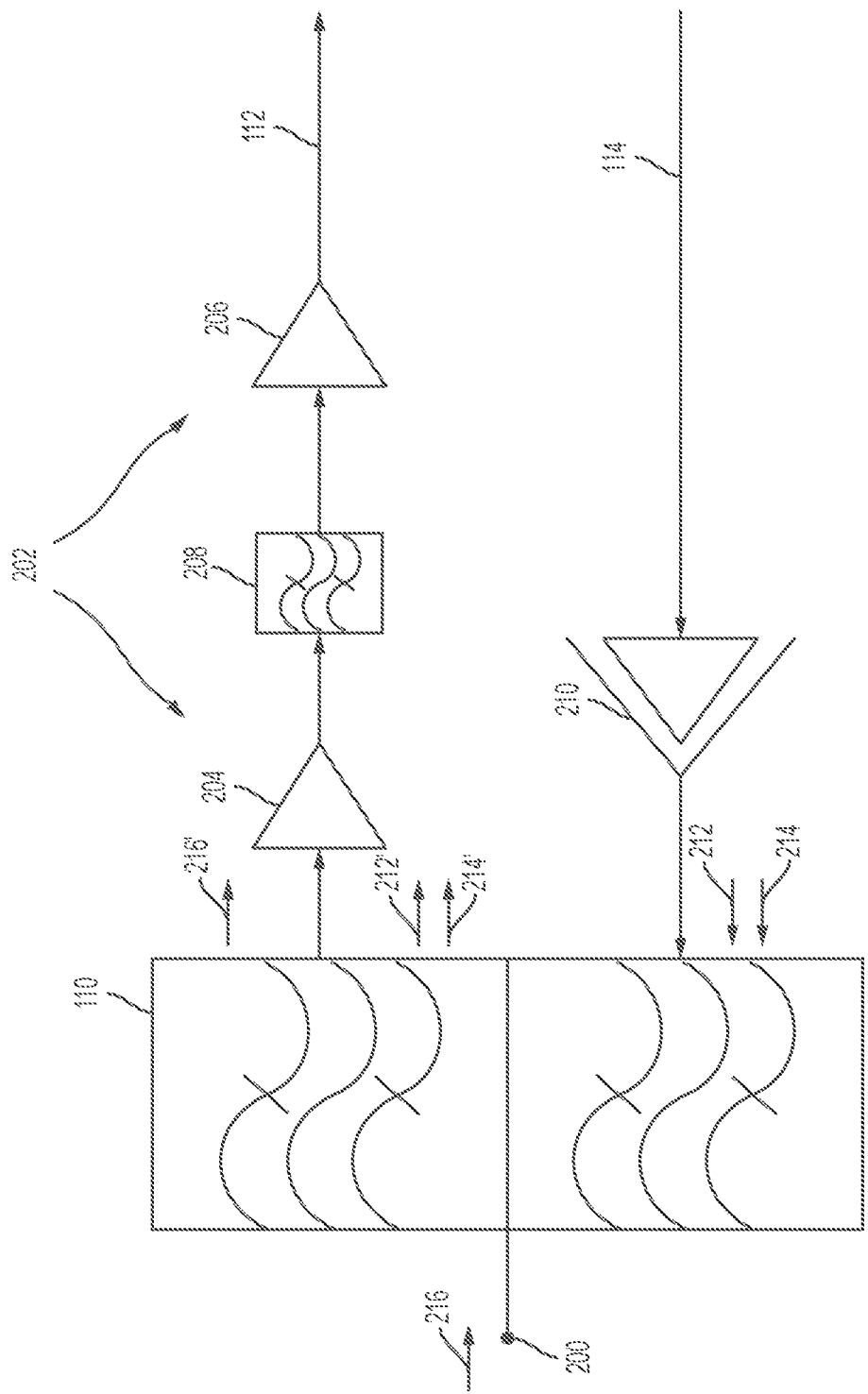
FIG. 2 is a schematic view of an example of a duplexer configuration for improving blocking and linearity performance according to one aspect.

FIG. 2 shows an example of a duplexer configuration including the duplexer 110. The duplexer 110 may allow bi-directional communication over a single path connected to a common port 200. The bi-directional communication may allow the duplexer to be coupled to an antenna (e.g., antenna 108A in the remote unit 106A of FIG. 1) through common port 200. The duplexer 110 may couple the common port 200 to the receive path 112 and the transmit path 114. The duplexer 110 may isolate the receive path 112 from the transmit path 114 and permit the receive path 112 and the transmit path 114 to share a single antenna 108A coupled to the common port 200.

The receive path 112 and the transmit path 114 may include one or more communicatively-linked components forming a signal path. Examples of communication links between the components forming the receive path 112 or the transmit path 114 may include but are not limited to electrical cable, optical fiber, or another suitable communication medium. In some examples, aspects of the receive path 112 or transmit path 114 may include free space. The duplexer 110 may be configured to operate in the frequency bands in which the receive path 112 and the transmit path 114 are operating. The duplexer 110 may also be configured to operate at or below the frequency separation between the frequency bands in which the receive path 112 and the transmit path 114 are operating. In some aspects, the duplexer 110 may include waveguide filters or other electronic filtering elements to allow and reject signals at different frequencies. The filtering elements of the duplexer 110 may allow the duplexer 110 to reject transmit signals occurring at a frequency band in which the receive path is operating (e.g., transmitter noise).

The duplexer 110 may be coupled to a distributed low-noise amplifier 202 including at least two amplifiers 204, 206 that are separated by a band-pass filter 208. In some aspects, the amplifiers 204, 206 may be positioned in the receive path 112. Although two amplifiers 204, 206 are shown in FIG. 2, a distributed low-noise amplifier 202 may include any number of separated amplifiers. In some aspects, the amplifiers 204, 206 may include different stages of a low-noise amplifier 202. For example, amplifier 204 may be directed to a low-noise stage of the distributed low-noise amplifier 202 Amplifier 206 may be directed to an amplification stage of the distributed low-noise amplifier 202. The amplifiers 204, 206 may be separated by the band-pass filter 208, or other filtering element as shown in FIG. 2. The band-pass filter 208 may be configured to allow signals of a certain frequency range to pass, and to reject or attenuate frequencies outside of that range. For example, the band-pass filter 208 may allow receive signals operating in the frequency band of the receive path 112 to pass, but attenuate transmit signals traversing the receive path 112. A power amplifier 210 may be positioned in the transmit path 114. The power amplifier 210 may be configured to increase or amplify the power of transmit signals traversing the transmit path 114 for transmission by the antenna 108A coupled to the common port 200 of the duplexer 110. The output of the power amplifier 210 may include the transmit signals having a larger amplitude or power than the transmit signals input into the power amplifier 210.

The duplexer 110 and the band-pass filter 208, together, may include the overall duplexer performance in two distributed stages. Similarly, the amplifiers 204, 206 may include the distributed low-noise amplifier performance in two distributed stages. Although only two stages are shown in FIG. 2, the duplexer configuration may include additional stages without departing from the scope of the present disclosure. The duplexer configuration may include an alternating sequence of active devices (e.g., amplifiers 204, 206) and filtering elements (e.g., band-pass filter 208) where the distributed filtering elements of the duplexer configuration are separated in the signal paths by active devices. For example, in FIG. 2, the filtering elements (e.g., the duplexer 110 and the band-pass filter 208 are alternated with the active devices (e.g., amplifiers 204, 206) in the receive path. Distributing and alternating the filtering elements and active devices may allow for linearity improvement of the receive path with respect to transmit signals as a source of intermodulation products in the receive path and the combination of transmit and receive signals as a source of intermodulation products in the receive path.

The duplexer configuration may operate at different frequencies to generate intermodulation products in the receive path 112 as indicated by the arrows in FIG. 2. Signals 212, 214, 216 may represent signals at different frequencies. Transmit signals 212, 214 may be within a frequency range of the transmit path. Receive signal 216 may be within a frequency range of a receive path. In some aspects, transmit signals 212, 214 may generate an intermodulation product at a frequency within the receive path frequency range and interfere with a wanted receive path signal. Transmit signal 212 and receive signal 216 may generate an intermodulation production at a frequency within the receive path frequency range and interfere with a wanted receive path signal. Transmit signal 214 and receive signal 216 also may cause an interferer. In one example, the transmit path frequency range may be 1930 MHz to 1995 MHz and the receive path frequency range may be 1850 MHz to 1915 MHz. Amplifiers 204, 206 may be broadband (e.g., 1850 MHz to 1995 MHz). The band-pass filter 208 may be narrowband (e.g., 1850 MHz to 1915 MHz) and have high suppression (e.g., 30 dB) at 1930 MHz to 1995 MHz. The intermodulation product at 1890 MHz may be generated by transmit signals 212', 214' in the receive path and may cause an interferer for a wanted receive signal at 1890 MHz, where the transmit signal 212' includes a frequency of 1930 MHz and transmit signal 214' includes a frequency of 1970 MHz. In additional or alternative examples, the intermodulation product at 1875 MHz may be generated by the transmit signal 212' and the receive signal 216' in the receive path. The intermodulation product may cause an interferer for a wanted receive signal at 1875 MHz, where the frequency of transmit signal 212' in the receive path is 1955 MHz and the frequency of receive signal 216' in the receive path is 1915 MHz.

The input level of unwanted transmit signals at the low-noise stage may be higher without harming the blocking performance of the receive path. In some aspects, this may be due to the low-noise stage of amplifier 204 having a lower gain, individually, than the distributed low-noise amplifier 202 formed by the amplifiers 204, 206. Linearity may be significantly higher for unwanted transmit signals, or unwanted transmit signals and wanted receive signals, because attenuating or rejecting of the band-pass filter 208 for transmit signals 212', 214' may suppress a contribution of the amplification stage of amplifier 206. In some aspects, the amplification stage of the distributed low-noise amplifier 202 may also be dominant with respect to linearity in non-distributed duplexer configurations. Enhancing linearity and blocking performance of the receive path by the distributed duplexer configuration may allow for relaxing the strict isolation requirement for transmit signals 212, 214 into the receive path. Isolating transmit signals 212, 214 from the receive path may be relaxed due to distributing the duplexer performance (between the duplexer 110 and the band-pass filter 208) and the low-noise amplifier performance (between amplifiers 204, 206), as well as alternating filtering elements (e.g., duplexer 110, band-pass filter 208) and active devices (amplifier 204, 206).

Figure 3:
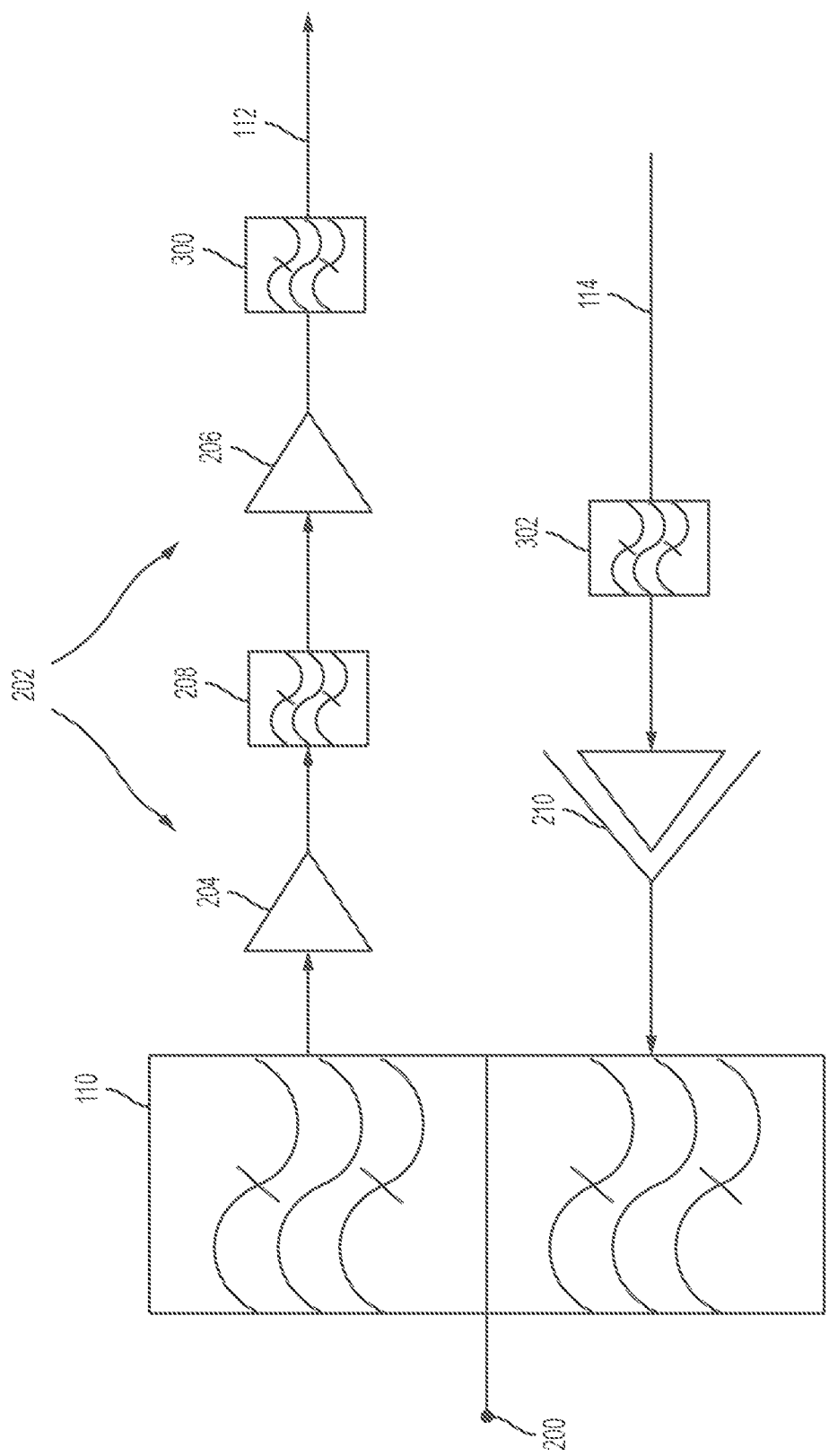
FIG. 3 is a schematic view of another example of a duplexer configuration for improving blocking and linearity performance according to one aspect.

In some aspects, the duplexer configuration may include distributing the overall duplexer performance or low-noise amplifier performance to additional stages beyond the two stages shown in FIG. 2. For example, a distributed duplexer configuration may be implemented in two or more stages according to the overall receive path 112 requirements. Additional filtering stages or additional filtering stages with additional amplifier stages may be implemented if the receive path requires more blocking or linearity enhancement than may be achieved by two distribution stages. For example, FIG. 3 shows an example of a duplexer configuration where the filtering stages of the duplexer performance is distributed between additional stages. The duplexer configuration includes a distributed receive path 112 and a distributed transmit path 114 configuration. The receive path 112 and the transmit path 114 are coupled to the common port 200 by the duplexer 110. The receive path 112 includes amplifiers 204, 206, separated by band-pass filter 208. The receive path 112 also includes an additional band-pass filter 300 positioned to receive the output of the amplifier 206. The transmit path 114 includes the power amplifier 210 and an additional band-pass filter 302. The power amplifier 210 is positioned in the transmit path 114 to separate the duplexer 110 and the band-pass filter 302. In this configuration, the receive path 112 and the transmit path 114 include distributing the filtering elements (e.g., the duplexer 110 and the band-pass filters 208, 300, 302) and the active devices (e.g., the amplifiers 204, 206 and the power amplifier 210) in an alternating sequence.

Figure 4:
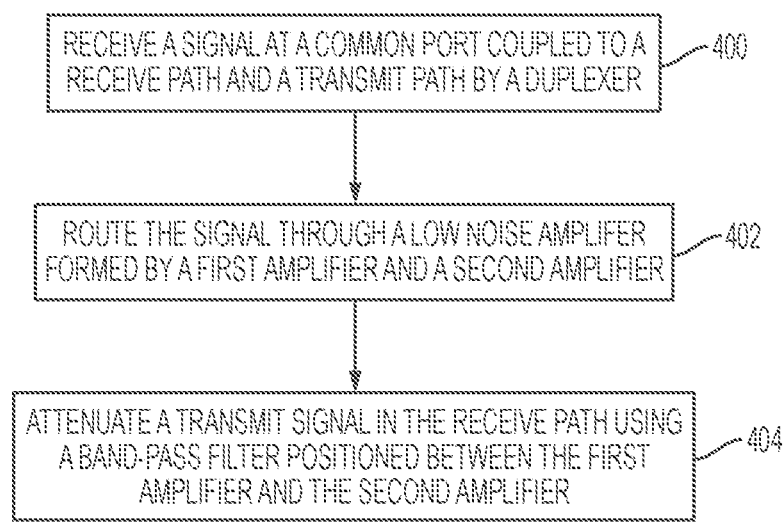
FIG. 4 is a flow chart of a process for improving blocking and linearity performance in a telecommunications system according to one aspect.

FIG. 4 is a flowchart describing an example of a process for improving linearity and blocking performance in the DAS 100. The process is described with respect to the DAS 100 of FIG. 1 and the duplexer configuration shown in FIG. 2, although other implementations are possible.

In block 400, the signal 216 is received at the common port 200 of the duplexer 110. In some aspects, the duplexer 110 may be disposed in a remote unit 106A in the DAS 100 shown in FIG. 1. The common port 200 may be coupled to an antenna 108A of the remote unit 106A. The antenna 108A may be configured to receive uplink signals and transmit downlink signals in the DAS 100. The duplexer 110 may receive the uplink signals from the antenna at a common port of the duplexer 110 and direct them into the receive path 112. The duplexer 110 may also receive the downlink signals from the transmit path 114 and direct them to the antenna 108A via the common port 200. In some aspects, the signal 216 received by the common port 200 via the antenna 108A may be an analog uplink signal. The analog signal may be received from a user device communicatively coupled to the remote unit 106A and positioned in a coverage area of the DAS 100 serviced by the remote unit 106A. In other aspects, the duplexer 110 may be disposed in the head-end unit 104 or another unit (e.g., an extension unit). For example, the common port 200 of the duplexer 110 may be coupled to a head-end unit antenna (not shown) that may receive and transmit signals in the DAS 100.

In block 402, the signal 216' (e.g., signal 216 traversing the receive path 112) is routed through a distributed low-noise amplifier 202 formed by a first amplifier 204 and a second amplifier 206. The signal 216 received at the common port 200 may be routed to the distributed low-noise amplifier 202 by the duplexer 110. The signal may include a frequency within the frequency band in which the receive path 112 operates. Based on the frequency or other characteristic of the signal 216, the duplexer 110 will direct the signal 216 into receive path 112 having the distributed low-noise amplifier 202. In some aspects, the first amplifier 204 of the distributed low-noise amplifier 202 may include a low-noise stage. The second amplifier 206 of the distributed low-noise amplifier 202 may include an amplification stage. Together, the first amplifier 204 and the second amplifier 206 may amplify the signal 216' while adding little noise to the amplified signal 216' for further processing by additional components in the receive path 112. In some aspects, the first amplifier 204 of the distributed low-noise amplifier 202 may be positioned proximate to the duplexer 110. For example, the first amplifier 204 may be directly coupled to the duplexer 110 as shown in FIG. 2. The proximity of the first amplifier 204 to the duplexer 110 may minimize losses and interferences in the receive path 112 prior to processing of the signal 216' by the low-noise amplifier 202.

In block 404, a transmit signal 212', 214' in the receive path 112 may be attenuated. The transmit signal 212', 214' may be attenuated using a band-pass filter 208. The band-pass filter 208 may allow the receive signal 216' operating in the frequency band of the receive path 112 to pass, but attenuate transmit signals 212', 214' traversing the receive path 112. By attenuating the transmit signals 212', 214' in the receive path 112, the band-pass filter 208 aids the duplexer in the isolation of the receive path 112 from the transmit path 114. The duplexer 110 and the band-pass filter 208 may together contribute to the overall performance of the duplexer 110 to isolate the receive path 112 from the transmit path 114. In additional and alternative aspects, the overall duplexer performance may be further distributed to additional filtering elements. For example, as shown in FIG. 3, the receive path 112 may include an additional band-pass filter 300 that may further attenuate transmit signals traversing the receive path 112. In some aspects, a need for additional filtering elements to attain the same or improved blocking or linearity enhancement may depend on the filter technology used (e.g., micro-strip filter, lumped element filter). Thus, the blocking and linearity attained by the duplexer configuration of FIG. 3 may be attained by a duplexer configuration having fewer stages, but using another filter technology. Similarly, additional stages in the distribution configuration may facilitate the use of filter types other than band-pass filters (e.g., low-pass filters, high pass filters). The distributed duplexer configurations may use one filter technology or combine different filter technologies (e.g., cavity technology and ceramic filter technology) for the filtering elements depending on installation requirements for the receive path 112 or transmit path 114. Distributing the duplexer performance and the low-noise amplifier performance by using two or more stages of active devices and filtering elements and by positioning the active devices and filtering elements in an alternating sequence may further improve linearity and blocking in the DAS 100.

The foregoing description of the examples, including illustrated examples, has been presented only for the purpose of illustration and description and is not intended to be exhaustive or to limit the subject matter to the precise forms disclosed. Numerous modifications, adaptations, and uses thereof will be apparent to those skilled in the art without departing from the scope of this disclosure. The illustrative examples described above are given to introduce the reader to the general subject matter discussed here and are not intended to limit the scope of the disclosed concepts.

What is claimed is:
1. A remote unit, comprising:
a duplexer couplable between (i) a common port and (ii) a receive path and a transmit path, the common port couplable to an antenna for transmitting downlink signals and receiving uplink signals, wherein the duplexer has relaxed isolation characteristics for transmitted downlink signals in the receive path, wherein the duplexer allows at least some transmitted downlink signals to traverse the receive path;

a first band-pass filter between a first amplifier and a second amplifier, the first amplifier and the second amplifier forming a low-noise amplifier in the receive path; and a second band-pass filter in the receive path, wherein the second amplifier is positioned between the first band-pass filter and the second band-pass filter;

wherein the first band-pass filter and the second band-pass filter are configured to pass uplink signals in a frequency range of the receive path.

2. The remote unit of claim 1, wherein the first amplifier is positioned between the duplexer and the band-pass filter in the receive path.

3. The remote unit of claim 1, wherein the first band-pass filter is configured to attenuate a transmitted downlink signal in the receive path, wherein the second band-pass filter is configured to attenuate the transmitted downlink signal in the receive path.

4. The remote unit of claim 1, wherein the transmit path includes a power amplifier.

5. The remote unit of claim 1, wherein the first amplifier is a low-noise stage and the second amplifier is an amplification stage.

6. The remote unit of claim 1, wherein the first amplifier includes a lower gain than a gain of the first amplifier and the second amplifier combined.

7. A telecommunications system, comprising:
a duplexer couplable between (i) a common port and (ii) a receive path and a transmit path, wherein the duplexer has relaxed isolation characteristics for transmitted downlink signals in the receive path, wherein the duplexer allows at least some transmitted downlink signals to traverse the receive path;
a distributed low-noise amplifier having two or more separate active devices in the receive path; and
at least one filtering element positioned between the two or more separate active devices, wherein the at least one filtering element includes a first band-pass filter and a second band-pass filter;
wherein the two or more separate active devices includes a first amplifier positioned between the duplexer and the first band-pass filter and a second amplifier positioned between the first band-pass filter and the second band-pass filter;
wherein the first band-pass filter and the second band-pass filter are configured to pass uplink signals in a frequency range of the receive path.

8. The telecommunications system of claim 7, wherein the two or more separate active devices include at least a first amplifier having a low-noise stage and a second amplifier having an amplification stage.

9. The telecommunications system of claim 7, wherein the at least one filtering element includes at least a band-pass filter positioned between the first amplifier and the second amplifier.

10. The telecommunications system of claim 7, wherein the two or more separate active devices are positioned in the receive path of a remote unit, wherein the common port is couplable to an antenna for transmitting downlink signals and receiving uplink signals.

11. The telecommunications system of claim 7, wherein the two or more separate active devices are positioned in a receive path of a head-end unit.

12. The telecommunications system of claim 7, further including a power amplifier positioned in the transmit path, wherein the two or more separate active devices are positioned in the receive path.

13. The telecommunications system of claim 12, further including an additional filtering element positioned in the transmit path, wherein the power amplifier is positioned between the duplexer and the additional filtering element.

14. The telecommunications system of claim 7, wherein the at least one filtering element is positioned in the receive path to attenuate a transmit signal in the receive path.

15. A method, comprising:
receiving a signal at a common port coupled to a receive path and a transmit path by a duplexer, wherein the duplexer has relaxed isolation characteristics for transmitted downlink signals in the receive path, wherein the duplexer allows at least some transmitted downlink signals to traverse the receive path;
routing the signal through a first amplifier and a second amplifier in the receive path, the first amplifier and the second amplifier together forming a low-noise amplifier; and
attenuating a transmit signal in the receive path using a first band-pass filter positioned between the first amplifier and the second amplifier, wherein the first amplifier is positioned between the duplexer and the first band-pass filter in the receive path; and
attenuating a transmit signal in the receive path using a second band-pass filter in the receive path, wherein the second amplifier is positioned between the first band-pass filter and a second band-pass filter in the receive path;
wherein the first band-pass filter and the second band-pass filter are configured to pass uplink signals in a frequency range of the receive path.

16. The method of claim 15, wherein the first amplifier is a low-noise stage and the second amplifier is an amplification stage, wherein the first amplifier, the second amplifier, the first band-pass filter, and the second band-pass filter are positioned in the receive path to improve linearity and blocking performance in a telecommunications system.

17. The method of claim 15, further including routing the transmit signal through a power amplifier in the transmit path, wherein the transmit signal generates intermodulation products in the receive path.

18. The method of claim 17, wherein the power amplifier is positioned between the duplexer and a third band-pass filter in the transmit path.

* * * * *